United States Patent
Konishi (10) Patent No.: US 8,270,773 B2
(45) Date of Patent: Sep. 18, 2012

(54) IMAGE PROCESSING APPARATUS AND IMAGE PROCESSING METHOD

(75) Inventor: Shugo Konishi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 838 days.

(21) Appl. No.: 12/418,451

(22) Filed: Apr. 3, 2009

(65) Prior Publication Data

US 2010/0027913 A1 Feb. 4, 2010

(30) Foreign Application Priority Data

Aug. 4, 2008 (JP) ................................. 2008-201139

(51) Int. Cl.
*G06K 9/32* (2006.01)
(52) U.S. Cl. ........................................ 382/299; 382/298
(58) Field of Classification Search .................. None
See application file for complete search history.

(56) References Cited

U.S. PATENT DOCUMENTS

| | | | |
|---|---|---|---|
| 5,649,083 A * | 7/1997 | Barkans et al. ............... | 345/597 |
| 6,693,644 B1 | 2/2004 | Moriwaki et al. | |
| 2003/0048322 A1 * | 3/2003 | Konno et al. .................. | 347/19 |
| 2004/0027488 A1 * | 2/2004 | Messina et al. ............... | 348/584 |
| 2005/0063471 A1 * | 3/2005 | Regunathan et al. .... | 375/240.21 |
| 2005/0226540 A1 * | 10/2005 | Schweng ....................... | 382/300 |
| 2005/0276489 A1 | 12/2005 | Ishikawa | |
| 2006/0257034 A1 * | 11/2006 | Gish et al. ..................... | 382/239 |
| 2007/0041664 A1 * | 2/2007 | Yamada ......................... | 382/299 |
| 2007/0047838 A1 * | 3/2007 | Milanfar et al. ............... | 382/289 |
| 2007/0223887 A1 * | 9/2007 | Kanamori et al. ............ | 386/112 |

FOREIGN PATENT DOCUMENTS

| | | |
|---|---|---|
| JP | HE108-205130 | 8/1996 |
| JP | 2000-188680 | 7/2000 |
| JP | 2001-209789 | 8/2001 |
| JP | 2001-359117 | 12/2001 |
| JP | 2003-069961 | 3/2003 |
| JP | 2004-173215 | 6/2004 |
| JP | 2005-017725 | 1/2005 |
| JP | 2005-354643 | 12/2005 |
| JP | 2006-208770 | 8/2006 |
| JP | 2007-259405 | 10/2007 |

(Continued)

OTHER PUBLICATIONS

Japanese Patent Application No. 2008-201139, Notice of Rejection, mailed Oct. 27, 2009 (English translation).

(Continued)

*Primary Examiner* — Li Liu
(74) *Attorney, Agent, or Firm* — Blakely, Sokoloff, Taylor & Zafman LLP (57) ABSTRACT

According to one embodiment, an image processing apparatus includes a super-resolution converter, a reducing module, and a restoring module. The super-resolution converter estimates, upon receipt of a first image signal with first resolution, an original pixel value from the first image signal and increases pixels to obtain a second image signal with second resolution higher than the first resolution. The first image signal and the second image signal include a combination of a luminance signal and a color difference signal. The reducing module reduces a first quantization bit rate of the color difference signal in the first image signal to be input to the super-resolution converter to a second quantization bit rate. The restoring module restores the second quantization bit rate of the color difference signal in the second image signal to the first quantization bit rate.

9 Claims, 7 Drawing Sheets

FOREIGN PATENT DOCUMENTS

| | | |
|---|---|---|
| JP | 2007-310837 | 11/2007 |
| JP | 2007-336239 | 12/2007 |
| JP | 2008-098803 | 4/2008 |
| JP | 2008-131244 | 6/2008 |
| WO | WO 2006/080102 | 8/2006 |
| WO | WO 2007/097067 | 8/2007 |

OTHER PUBLICATIONS

Japanese Patent Application No. 2008-201139, Notice of Rejection, Mailed Aug. 4, 2009, (English translation).

* cited by examiner

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2008-201139, filed Aug. 4, 2008, the entire contents of which are incorporated herein by reference.

BACKGROUND

1. Field

One embodiment of the invention relates to an image processing apparatus and an image processing method.

2. Description of the Related Art

Various technologies have been proposed for image signal compression. For example, Japanese Patent Application Publication (KOKAI) No. 2001-359117 discloses a conventional technology, in which, upon receipt of an image signal including a color difference signal and a luminance signal through an image receiver, the information amount of the color difference signal is reduced when the image signal represents a moving image. Thus, the color difference signal is compressed together with the luminance signal.

Meanwhile, with the widespread of high-resolution televisions and displays, the resolution of image signals becomes higher. As the resolution of an image signal increases, the data volume involved in image processing on the image signal increases. Therefore, there is a need for a technology capable of more efficient image processing. Accordingly, there has been proposed the technology of image processing referred to as super resolution processing. In the super resolution processing, an original pixel value is estimated from a low-resolution image signal, and the pixels are increased to obtain a high-resolution image signal. Thus, the super resolution processing increases the resolution of an image signal while maintaining the sharpness thereof. To handle image signals with high data volume, the super resolution processing is required to be performed efficiently.

The conventional technology described above is capable of reducing the data volume of an image signal when compressing the image signal. However, it is not considered that the super resolution processing is performed on the image signal, and thus this technology cannot be used directly. Besides, with the conventional technology, a luminance signal is compressed with a color difference signal of which the information amount has been reduced. This degrades image quality, and the degradation may become significant due to the super resolution processing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image processing apparatus comprises a super-resolution converter, a reducing module, and a restoring module. The super-resolution converter is configured to estimate, upon receipt of a first image signal with first resolution, an original pixel value from the first image signal and increase pixels to obtain a second image signal with second resolution that is higher than the first resolution. The first image signal and the second image signal include a combination of a luminance signal and a color difference signal. The reducing module is located at a former stage of the super-resolution converter, and is configured to reduce a first quantization bit rate of the color difference signal in the first image signal to be input to the super-resolution converter to a second quantization bit rate. The restoring module is located at a latter stage of the super-resolution converter, and is configured to restore the second quantization bit rate of the color difference signal in the second image signal to the first quantization bit rate.

According to another embodiment of the invention, an image processing apparatus comprises a super-resolution converter, a reducing module, and a restoring module. The super-resolution converter is configured to perform, upon receipt of a first image signal with first resolution, super resolution conversion to increase resolution of the first image signal to obtain a second image signal with second resolution. The first image signal and the second image signal include a combination of a luminance signal and a color difference signal. The reducing module is located at a former stage of the super-resolution converter, and is configured to reduce a first quantization bit rate of the color difference signal in the first image signal to be input to the super-resolution converter to a second quantization bit rate. The restoring module is located at a latter stage of the super-resolution converter, and is configured to restore the second quantization bit rate of the color difference signal in the second image signal to the first quantization bit rate.

According to still another embodiment of the invention, an image processing method is applied to an image processing apparatus configured to perform predetermined image processing on a first image signal with first resolution and comprising a super-resolution converter configured to estimate an original pixel value from the first image signal and increase pixels to obtain a second image signal with second resolution that is higher than the first resolution. The first image signal and the second image signal includes a combination of a luminance signal and a color difference signal. The image processing method comprises: reducing, by a reducing module located at a former stage of the super-resolution converter, a first quantization bit rate of the color difference signal in the first image signal to a second quantization bit rate prior to the super resolution conversion; and restoring, by a restoring module located at a latter stage of the super-resolution converter, the second quantization bit rate of the color difference signal in the second image signal to the first quantization bit rate.

Figure 1:
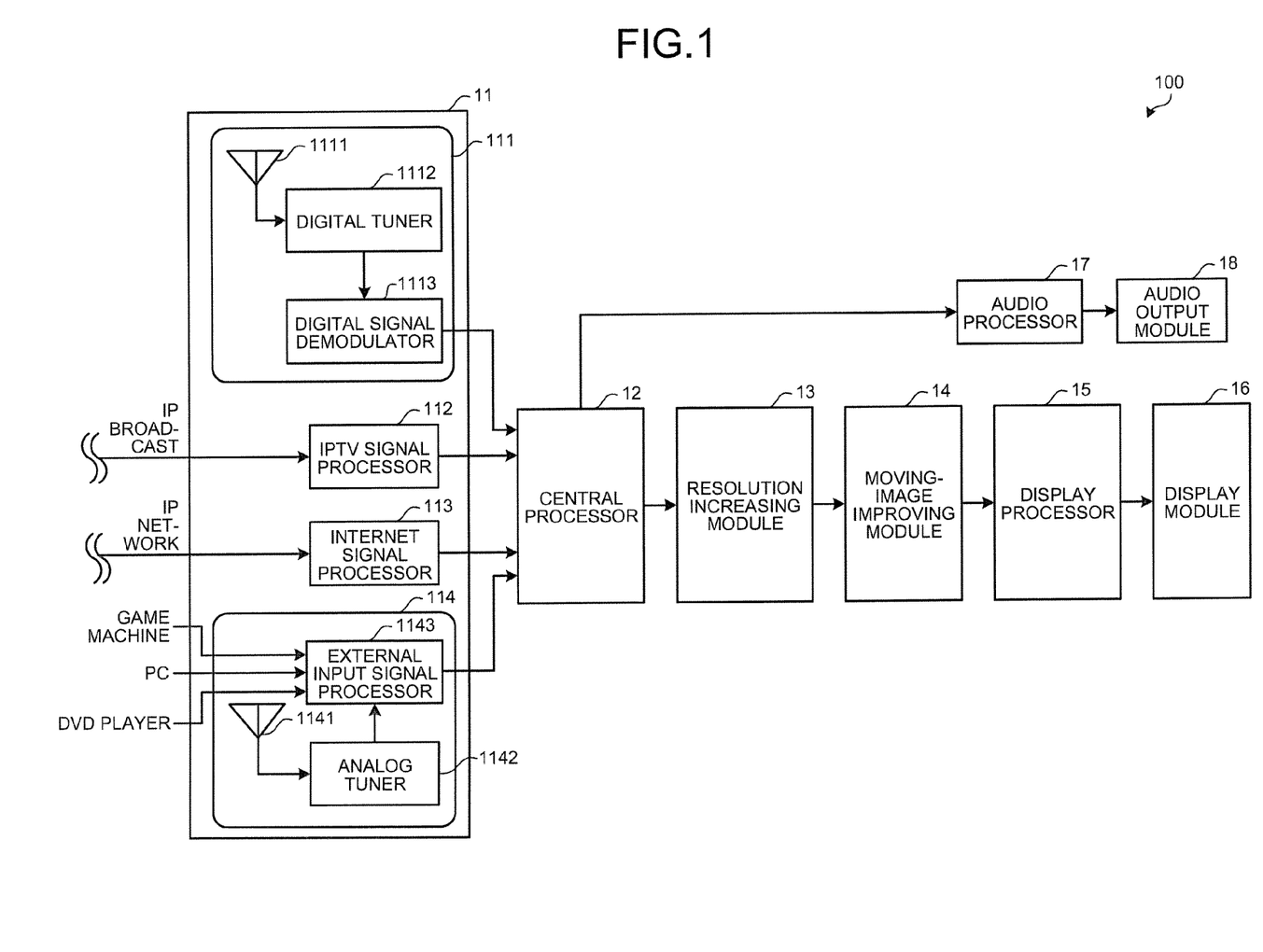
FIG. 1 is an exemplary block diagram of an image display apparatus according to a first embodiment of the invention.

FIG. 1 is a schematic block diagram of an image display apparatus 100 according to a first embodiment of the invention. As illustrated in FIG. 1, the image display apparatus 100 comprises a video signal input module 11, a central processor 12, a resolution increasing module 13, a moving-image improving module 14, a display processor 15, a display module 16, an audio processor 17, and an audio output module 18. The resolution increasing module 13 corresponds to an image processing apparatus.

The video signal input module 11 comprises a digital broadcast receiver 111, an Internet protocol television (IPTV) signal processor 112, an Internet signal processor 113, and an external input module 114. The digital broadcast receiver 111 receives an video signal to be displayed. The Internet signal processor 113 receives data transmitted through an IP network such as the Internet. The external input module 114 receives input of an analog signal. The term "video signal" as used herein includes audio signals as well as image signals such as still image signals and moving image signals.

The digital broadcast receiver 111 comprises a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives TP broadcasting transmitted over a dedicated IP network, and outputs it to the central processor 12 as a digital video signal.

The Internet signal processor 113 receives data (still image, moving image, etc.) transmitted through an IP network such as the Internet, and outputs it to the central processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing, such as A/D conversion, on an analog signal, and outputs it to the central processor 12 as a digital video signal. The external input signal processor 1143 is provided with a terminal (not illustrated) for connection to an external device such as a game machine, a personal computer (PC), a digital versatile disk (DVD) player. The external input signal processor 1143 performs the signal processing also on an analog signal received from an external device through the terminal.

The central processor 12 separates a video signal received by the video signal input module 11 into an image signal and an audio signal. After performing predetermined signal processing on the image signal, the central processor 12 outputs the image signal to the resolution increasing module 13. Examples of the signal processing performed by the central processor 12 include format conversion for converting the format of an input image signal to a predetermined format (e.g., MPEG) and scaling for converting the resolution of an input image signal to a predetermined resolution (e.g., 1280× 720).

Figure 2:
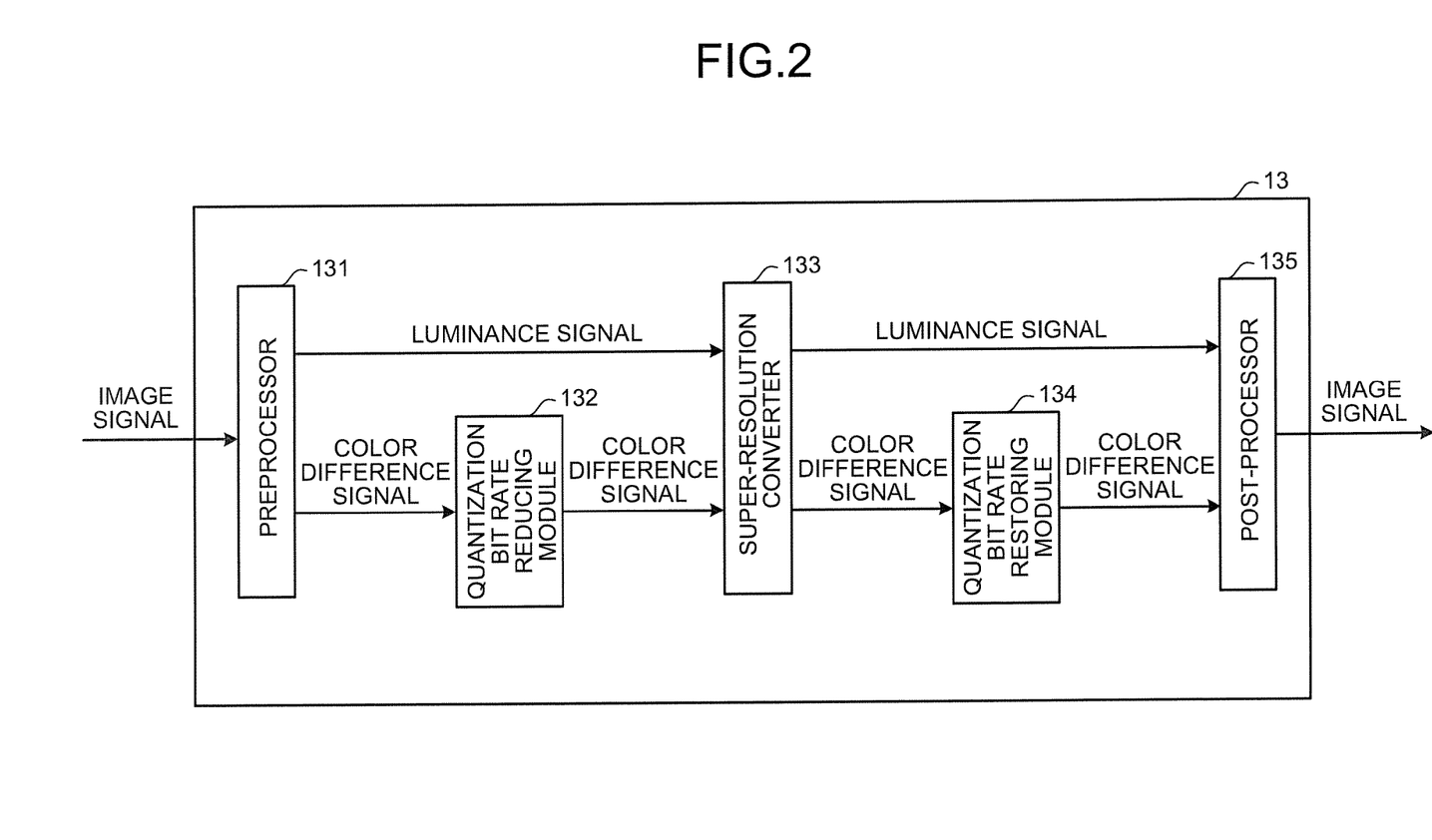
FIG. 2 is an exemplary block diagram of a resolution increasing module in the first embodiment.

FIG. 2 is a block diagram of the resolution increasing module 13. As illustrated in FIG. 2, the resolution increasing module 13 comprises a preprocessor 131, a quantization bit rate reducing module 132, a super-resolution converter 133, a quantization bit rate restoring module 134, and a post-processor 135.

The preprocessor 131 performs preprocessing on a luminance signal and a color difference signal received from the central processor 12, and then outputs the luminance signal to the super-resolution converter 133 as well as outputting the color difference signal to the quantization bit rate reducing module 132. Examples of the preprocessing include interlace/progressive (IP) conversion and noise reduction (NR) processing to remove noise from an image signal.

More specifically, as the IP conversion, the preprocessor 131 detects motion of an image in an image signal (a luminance signal and a color difference signal) and determines whether the image signal represents a still image or a moving image. When the image signal represents a still image, the preprocessor 131 performs still image interpolation. On the other hand, when the image signal represents a moving image, the preprocessor 131 performs moving image interpolation. As the NR processing, the preprocessor 131 corrects the contour of an image, reduces image blur and glare, suppresses excessive equalizing (high-frequency enhancement), and corrects camera shake blur caused by the horizontal movement of a camera.

If an image signal from the central processor 12 has not been separated into a color difference signal (C signal) and a luminance signal (Y signal) in a format such as YCbCr, the preprocessor 131 performs Y/C separation for separating the image signal into a luminance signal and a color difference signal.

The quantization bit rate reducing module 132 reduces the quantization bit rate of the color difference signal received from the preprocessor 131, and then outputs it to the super-resolution converter 133. The quantization bit rate may be reduced by known or commonly used technologies including, specifically, for example, bit shift and the use of a dither pattern such as a magic square: an n×n matrix (n: an integer) in which the sum of the elements in each row, in each column, and in the two diagonals is the same value.

Although the quantization bit rate reduction reduces the accuracy of the color difference signal, the human eye has a visual characteristic such that it recognizes changes in brightness more easily than changes in color. Therefore, if the accuracy of the color difference signal drops to a certain level, it does not cause significant degradation. According to the first embodiment, based on this visual characteristic of the human eye, the quantization bit rate reducing module 132 reduces the quantization bit rate of only a color difference signal that constitutes an image signal (a luminance signal and a color difference signal). Thus, the information amount of the entire image signal is reduced while visual display quality is maintained. Preferably, the quantization bit rate reducing module 132 reduces the quantization bit rate by a value which takes into consideration the above visual characteristic.

The super-resolution converter 133 performs image processing (hereinafter, "super resolution conversion") on an image signal including a combination of the luminance signal received from the preprocessor 131 and the color difference signal received from the quantization bit rate reducing module 132 to increase the resolution of the image signal. The super-resolution converter 133 outputs, from the image signal subjected to the super resolution conversion, the luminance signal to the post-processor 135 and the color difference signal to the quantization bit rate restoring module 134.

The term "super resolution conversion" as used herein refers to image processing, in which, from an image signal with low resolution, i.e., first resolution, an original pixel value is estimated to increase the pixels and thus to restore an image signal with high resolution, i.e., second resolution (a high-resolution frame).

The term "original pixel value" as used herein refers to the value of each pixel of an image signal obtained by, for example, photographing the same object as that of an image with low resolution (first resolution) with a camera having high-resolution pixels and capable of capturing an image with high resolution (second resolution).

Besides, "original pixel value is estimated to increase the pixels" means to obtain the characteristics of images to find a correlated image, and estimate an original pixel value from neighboring images (in the same frame or between frames) using the correlated image to increase the pixels.

The super resolution conversion may be performed using known or commonly used technologies as disclosed in, for example, Japanese Patent Application Publication (KOKAI) Nos. 2007-310837, 2008-98803, and 2000-188680. In the first embodiment, the super resolution conversion uses a technology of, for example, restoring an image with frequency components above the Nyquist frequency determined by the sampling rate of an input image.

If employing the super resolution conversion disclosed in Japanese Patent Application Publication (KOKAI) No. 2007-310837, the super-resolution converter 133 sets a target pixel in each of a plurality of low-resolution image signals (low-resolution frames), and sets a target image area so that it contains the target pixel. The super-resolution converter 133 selects a plurality of correspondent points that correspond to a plurality of target image areas closest to a variation pattern of the pixel value in the target image area from a reference frame. The super-resolution converter 133 sets a sample value of luminance of a correspondent point to the pixel value of a corresponding target pixel. The super-resolution converter 133 calculates a pixel value for a high-resolution frame having more pixels than the reference frame and corresponding to the reference frame based on the size of a plurality of sample values and layout of the correspondent points. Thus, the super-resolution converter 133 estimates an original pixel value from a low-resolution image signal, and increases the pixels to restore a high-resolution image signal.

If employing the super resolution conversion using self-congruency position search in the same frame image disclosed in Japanese Patent Application Publication (KOKAI) No. 2008-98803, the super-resolution converter 133 calculates a first pixel position with the smallest error, i.e., a first error, by comparing errors of respective pixels in a search area of a low-resolution frame. The super-resolution converter 133 calculates a position with the smallest error in the search area with decimal precision based on the first pixel position and the first error, and a second pixel position around a first pixel and a second error thereof. The super-resolution converter 133 calculates a decimal-precision vector that has its end point at the position with the smallest error and its start point at a pixel of interest. The super-resolution converter 133 calculates an extrapolation vector of the decimal-precision vector that has its end point at a pixel on a screen which is not in the search area based on the decimal-precision vector. The super-resolution converter 133 calculates a pixel value for a high-resolution image having more pixels than image data based on a pixel value obtained from the image data, the decimal-precision vector, and the extrapolation vector. In this manner, the super-resolution converter 133 estimates an original pixel value from a low-resolution image signal, and increases the pixels to restore a high-resolution image signal.

The super-resolution converter 133 may employ the super resolution conversion disclosed in Japanese Patent Application Publication (KOKAI) No. 2000-188680 using mapping between a plurality of frames.

The above technologies of the super resolution conversion are cited by way of example and not by way of limitation. The super-resolution converter 133 may employ various other technologies in which an original pixel value is estimated from a low-resolution image signal to increase the pixels to thereby obtain a high-resolution image signal.

Upon receipt of the color difference signal from the super-resolution converter 133, the quantization bit rate restoring module 134 restores the quantization bit rate thereof to the original value as before the color difference signal is input to the quantization bit rate reducing module 132. Then, the quantization bit rate restoring module 134 outputs the color difference signal to the post-processor 135. For example, when the quantization bit rate reducing module 132 has reduced the quantization bits of the color difference signal from 10 bits to 8 bits, the quantization bit rate restoring module 134 restores the quantization bits from 8 bits to 10 bits. The quantization bit rate may be restored by the reverse conversion of the quantization bit rate reduction as described above.

The post-processor 135 performs image correction such as gamma correction on the image signal including the luminance signal received from the super-resolution converter 133 and the color difference signal received from the quantization bit rate restoring module 134. After the image correction, the post-processor 135 outputs the image signal to the moving-image improving module 14 located at the latter stage.

In this manner, in the resolution increasing module 13, the quantization bit rate of a color difference signal is reduced before the processing of the super-resolution converter 133 and is restored to the original value after the processing of the super-resolution converter 133. This reduces the processing load on the super-resolution converter 133, suppresses the use of a memory (not illustrated) as a buffer for the processing, and also increases the processing speed. Thus, the process efficiency can be improved.

Referring back to FIG. 1, the moving-image improving module 14 generates an intermediate frame from the image signal received from the resolution increasing module 13 to increase the frames per second of the image signal to a predetermined value. After that, the moving-image improving module 14 outputs the image signal to the display processor 15 located at the latter stage. For example, if an image signal received from the resolution increasing module 13 has a frame rate of 60 frames per second, the moving-image improving module 14 generates an intermediate frame from an image of each of the 60 frames. Thus, the moving-image improving module 14 generates an image signal having a frame rate of 120 frames per second, and outputs it to the display processor 15.

The display processor 15 may be a display driver or the like and controls display of the image signal received from the moving-image improving module 14 on the display module 16. The display module 16 comprises a display device such as a liquid crystal display (LCD) panel or a surface-conduction electron-emitter display (SED) panel. The display module 16 displays an image according to the image signal on the screen under the control of the display processor 15.

The audio processor 17 converts a digital audio signal received from the central processor 12 into an analog audio signal in a format reproducible by the audio output module 18. The audio processor 17 then outputs the analog audio signal to the audio output module 18. The audio output module 18 may be a speaker or the like. On receipt of the analog audio signal from the audio processor 17, the audio output module 18 outputs it as audio.

Figure 3:
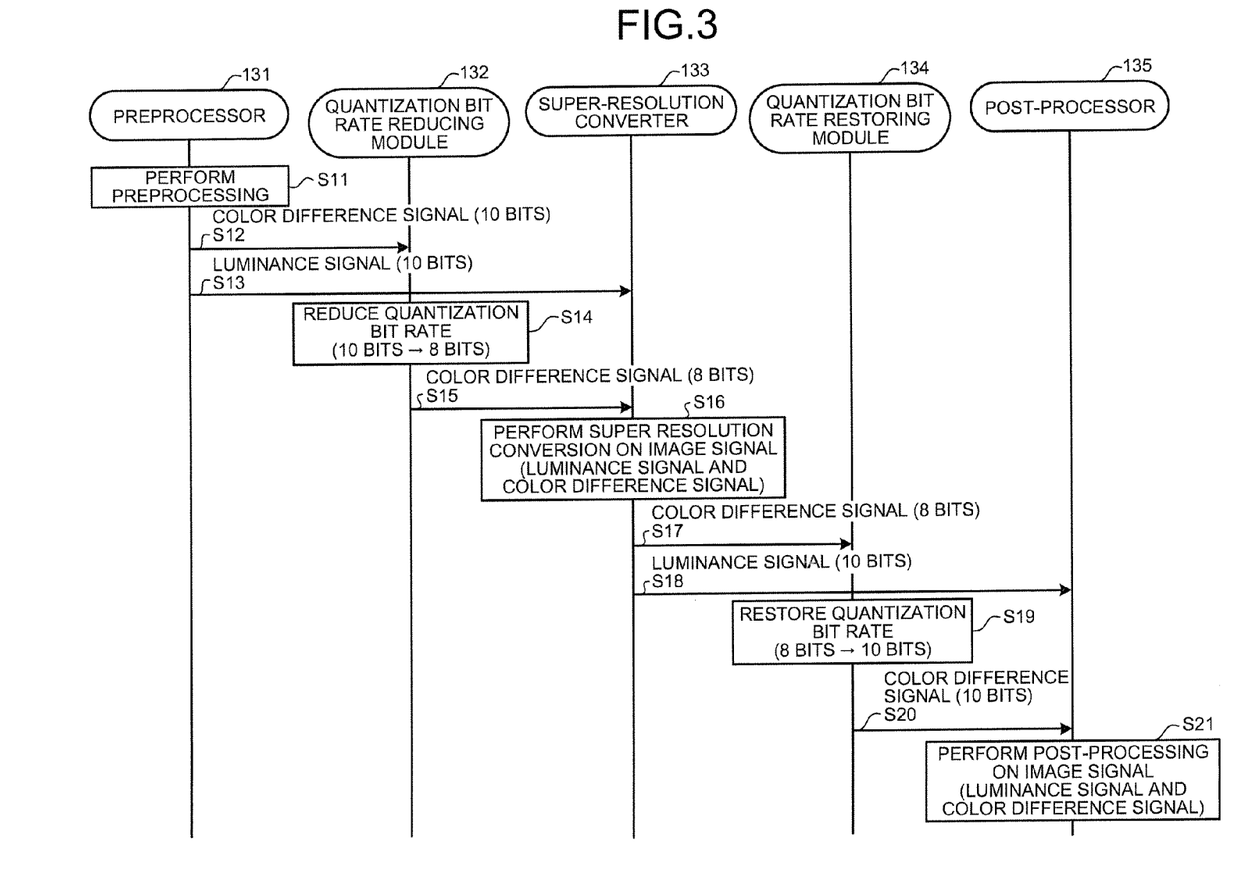
FIG. 3 is an exemplary sequence diagram of super resolution processing performed by the resolution increasing module of the first embodiment illustrated in FIG. 2.

A description will be given of the operation of the resolution increasing module 13. FIG. 3 is a sequence diagram of the super resolution processing performed by the resolution increasing module 13. In the following, an example will be described in which an image signal (a luminance signal and a color difference signal) with a quantization bit rate of 10 bits is subjected to the processing and the 10 bits are reduced to 8 bits.

When an image signal (a luminance signal and a color difference signal) is input from the central processor 12 to the resolution increasing module 13, the preprocessor 131 performs the preprocessing described above on the image signal (S11). It is assumed herein that the luminance signal and the color difference signal subjected to the processing of the preprocessor 131 are of an image signal of the same frame.

From the image signal subjected to the preprocessing, the preprocessor 131 outputs the color difference signal (10 bits) to the quantization bit rate reducing module 132 (312) as well as outputting the luminance signal (10 bits) to the super-resolution converter 133 (S13).

Upon receipt of the color difference signal from the preprocessor 131, the quantization bit rate reducing module 132 reduces the quantization bit rate of the color difference signal from 10 bits to 8 bits by bit shift, the use of a dither pattern, or the like (S34). Then, the quantization bit rate reducing module 132 outputs the 8-bit color difference signal to the super-resolution converter 133 (S35).

Upon receipt of an image signal including a combination of the luminance signal (10 bits) and the color difference signal (8 bits), the super-resolution converter 133 performs the super resolution conversion as described above on the image signal (S16).

Thereafter, the super-resolution converter 133 outputs the color difference signal (8 bits) subjected to the super resolution conversion to the quantization bit rate restoring module 134 (S17). Similarly, the super-resolution converter 133 outputs the luminance signal (10 bits) subjected to the super resolution conversion to the post-processor 135 (S18).

Upon receipt of the color difference signal from the super-resolution converter 133, the quantization bit rate restoring module 134 restores the quantization bit rate thereof to the original value as before the color difference signal is input to the quantization bit rate reducing module 132, i.e., from 8 bits to 10 bits, by reverse conversion using bit shift, a dither pattern, or the like (S19). The quantization bit rate restoring module 134 then outputs the color difference signal to the post-processor 135 (S20).

Upon receipt of an image signal including a combination of the luminance signal (10 bits) output from the super-resolution converter 133 and the color difference signal (10 bits) output from the quantization bit rate restoring module 134, the post-processor 135 performs the post-processing as described above on the image signal (S21). After that, the post-processor 135 outputs the image signal to the moving-image improving module 14, and thereby the process ends. It is assumed herein that the luminance signal and the color difference signal subjected to the processing of the post-processor 135 are of an image signal of the same frame.

As described above, according to the first embodiment, in an image signal including a combination of a luminance signal and a color difference signal, the quantization bit rate of only the color difference signal is reduced to a predetermined value before the super resolution conversion is performed on the image signal. Accordingly, the processing load involved in the super resolution conversion can be reduced. Thus, it is possible to efficiently perform the super resolution conversion as well as to maintain image quality.

Besides, the quantization bit rate is restored to the original value as before the quantization bit rate reduction. That is, the image signal is restored to the original state as before the quantization bit rate reduction. Thus, it is possible to prevent degradation in the quality of an image signal and to reduce the processing load involved in the super resolution conversion.

In the first embodiment, the quantization bit rate of a color difference signal is reduced by the quantization bit rate reducing module 132 arranged immediately before the super-resolution converter 133. According to a second embodiment of the invention, the quantization bit rate of a color difference signal is reduced immediately after the data format is converted by preprocessing. In the following, constituent elements corresponding to those of the first embodiment are designated by like reference numerals, and their description will not be repeated.

Figure 4:
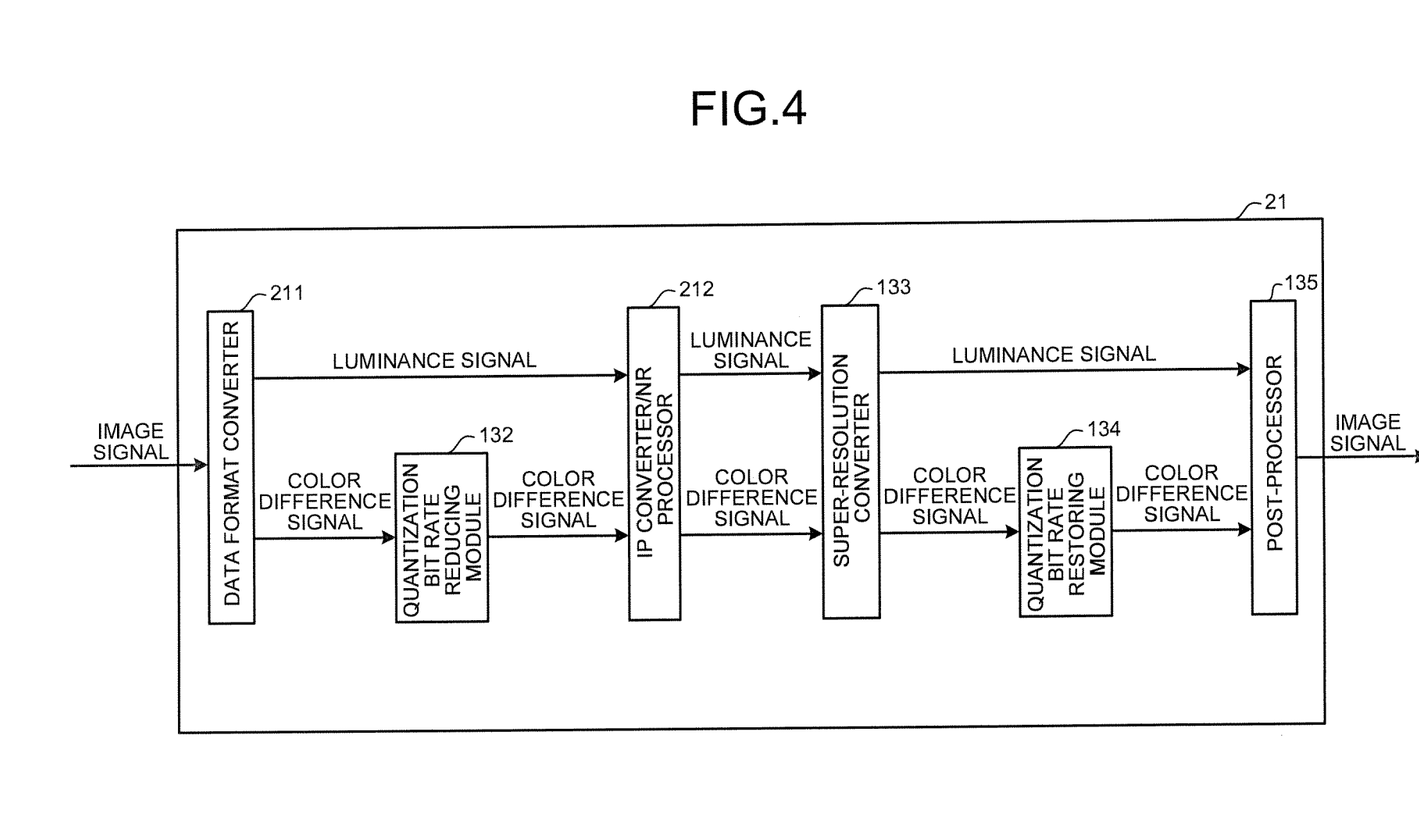
FIG. 4 is an exemplary block diagram of a resolution increasing module according to a second embodiment of the invention.

FIG. 4 is a block diagram of a resolution increasing module 21 according to the second embodiment. As illustrated in FIG. 4, the resolution increasing module 21 comprises a data format converter 211, the quantization bit rate reducing module 132, an IP converter/NR processor 212, the super-resolution converter 133, the quantization bit rate restoring module 134, and the post-processor 135.

The data format converter 211 and the IP converter/NR processor 212 are functional modules obtained by functionally dividing the preprocessor 131. In the second embodiment, it is assumed that an image signal from the central processor 12 has not been separated into a luminance signal (Y signal) and a color difference signal (C signal).

The data format converter 211 performs Y/C separation on an image signal received from the central processor to separate it into a luminance signal and a color difference signal in YCbCr format or the like. The data format converter 211 then outputs the luminance signal to the IP converter/NR processor 212 as well as outputting the color difference signal to the quantization bit rate reducing module 132.

The IP converter/NR processor 212 receives the luminance signal from the data format converter 211 and the color difference signal the quantization bit rate of which has been reduced by the quantization bit rate reducing module 132. The IP converter/NR processor 212 performs image processing such as IP conversion and NR processing as described above (hereinafter, "IP conversion/NR processing") on an image signal including a combination of the luminance signal and the color difference signal. The IP converter/NR processor 212 then outputs the image signal to the super-resolution converter 133.

Figure 5:
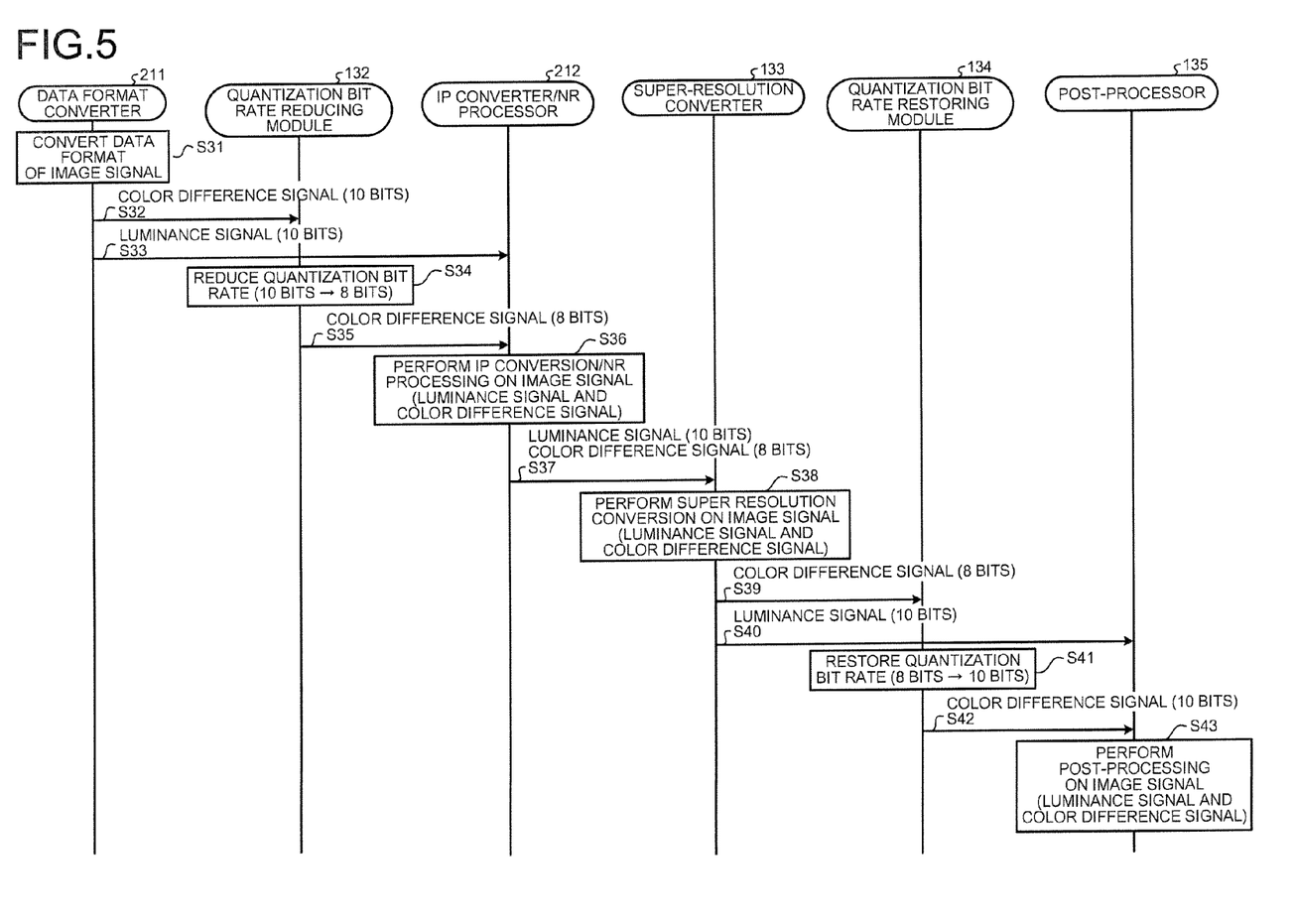
FIG. 5 is an exemplary sequence diagram of super resolution processing performed by the resolution increasing module of the second embodiment illustrated in FIG. 4.

With reference to FIG. 5, a description will be given of the operation of the resolution increasing module 21. FIG. 5 is a sequence diagram of the super resolution processing performed by the resolution increasing module 21. In the following, an example will be described in which an image signal (a luminance signal and a color difference signal) with a quantization bit rate of 10 bits is subjected to the processing and the 10 bits are reduced to 8 bits.

When an image signal is input from the central processor 12 to the resolution increasing module 21, the data format converter 211 separates the image signal into a luminance signal (10 bits) and a color difference signal (10 bits) (S31). Thereafter, the data format converter 211 outputs the color difference signal (10 bits) to the quantization bit rate reducing module 132 (S32) as well as outputting the luminance signal (10 bits) to the IP converter/NR processor 212 (S33).

Upon receipt of the color difference signal from the data format converter 211, the quantization bit rate reducing module 132 reduces the quantization bit rate of the color difference signal from 10 bits to 8 bits by bit shift, the use of a dither pattern, or the like (S34). Then, the quantization bit rate reducing module 132 outputs the 8-bit color difference signal to the IP converter/NR processor 212 (S35).

Upon receipt of an image signal including a combination of the luminance signal (10 bits) output from the data format converter 211 and the color difference signal (8 bits) output from the quantization bit rate reducing module 132, the IP converter/NR processor 212 performs IP conversion/NR processing on the image signal (S36). It is assumed herein that the luminance signal and the color difference signal subjected to the processing of the IP converter/NR processor 212 are of an image signal of the same frame.

Thereafter, the IP converter/NR processor 212 outputs the image signal subjected to the IP conversion/NR processing to the super-resolution converter 133 (S37).

The super-resolution converter 133 performs the super resolution conversion as described above on the image signal (the luminance signal and the color difference signal) received from the IP converter/NR processor 212 (S38). The super-resolution converter 133 then outputs the color difference signal (8 bits) subjected to the super resolution conversion to the quantization bit rate restoring module 134 (S39). Similarly, the super-resolution converter 133 outputs the luminance signal (10 bits) subjected to the super resolution conversion to the post-processor 135 (S40).

Upon receipt of the color difference signal from the super-resolution converter 133, the quantization bit rate restoring module 134 restores the quantization bit rate thereof to the original value as before the color difference signal is input to the quantization bit rate reducing module 132, i.e., from 8 bits to 10 bits, by reverse conversion using bit shift, a dither pattern, or the like (S41). The quantization bit rate restoring module 134 then outputs the color difference signal to the post-processor 135 (S42).

Upon receipt of an image signal including a combination of the luminance signal (10 bits) output from the super-resolution converter 133 and the color difference signal (10 bits) output from the quantization bit rate restoring module 134, the post-processor 135 performs the post-processing as described above on the image signal (S43). After that, the post-processor 135 outputs the image signal to the moving-image improving module 14, and thereby the process ends. It is assumed herein that the luminance signal and the color difference signal subjected to the processing of the post-processor 135 are of an image signal of the same frame.

As described above, according to the second embodiment, in an image signal including a combination of a luminance signal and a color difference signal, the quantization bit rate of only the color difference signal is reduced to a predetermined value before the super resolution conversion is performed on the image signal. Accordingly, the processing load involved in the super resolution conversion can be reduced. Thus, it is possible to efficiently perform the super resolution conversion as well as to maintain image quality.

Besides, the quantization bit rate is restored to the original value as before the quantization bit rate reduction. That is, the image signal is restored to the original state as before the quantization bit rate reduction. Thus, it is possible to prevent degradation in the quality of an image signal and to reduce the processing load involved in the super resolution conversion.

Moreover, the quantization bit rate of the color difference signal is reduced immediately after the image signal is separated into the luminance signal and the color difference signal. This reduces the load involved in image processing performed before the super resolution conversion, and thus enables further efficient image processing (super resolution conversion).

Incidentally, if the central processor 12 outputs an image signal as being separated into a luminance signal and a color difference signal to the resolution increasing module 21, the data format converter 211 is not necessary. In this case, the quantization bit rate reducing module 132 processes the color difference signal directly received from the central processor 12.

In the first and second embodiments, the quantization bit rate of a color difference signal is restored to the original value by the quantization bit rate restoring module 134 arranged immediately after the super-resolution converter 133. According to a third embodiment of the invention, the quantization bit rate of a color difference signal is restored immediately before the data format is converted to another. In the following, constituent elements corresponding to those of the first embodiment are designated by like reference numerals, and their description will not be repeated.

Figure 6:
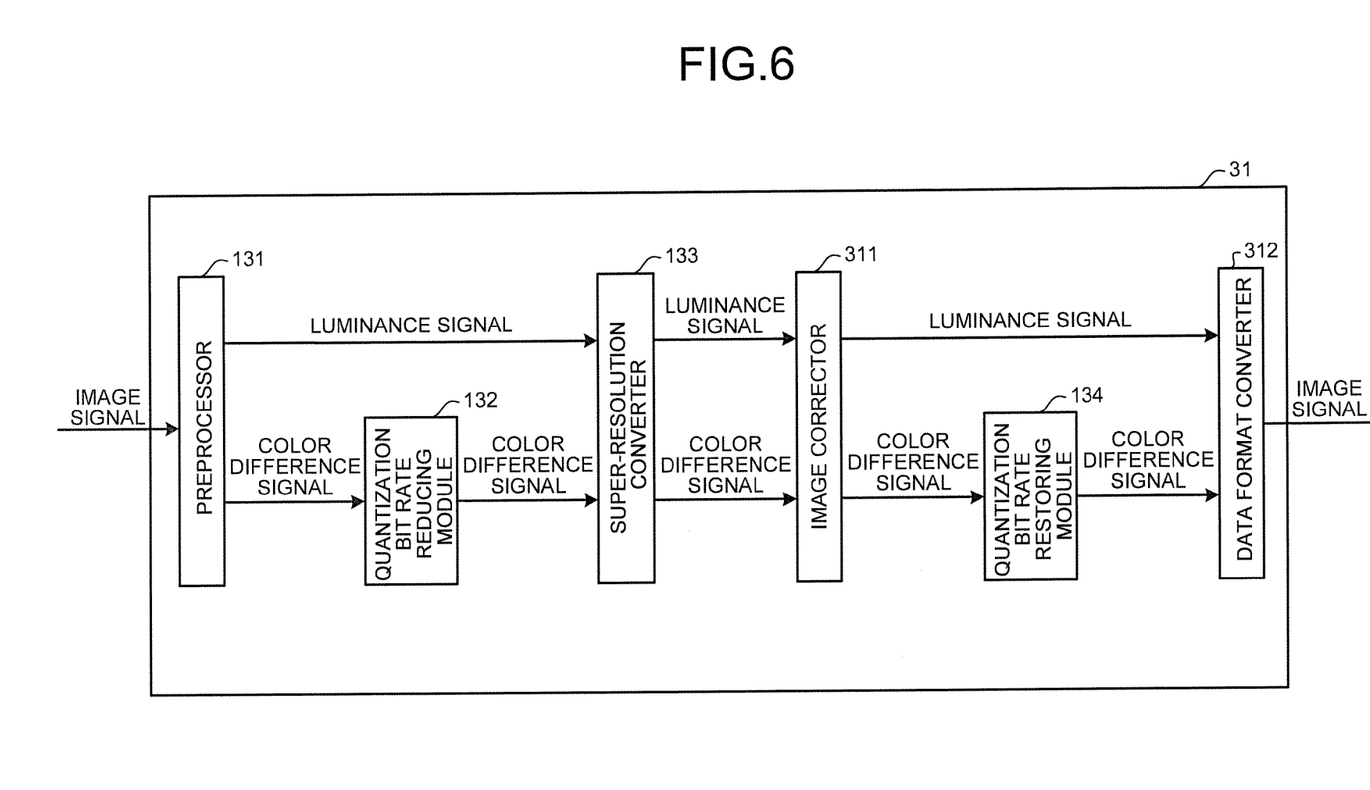
FIG. 6 is an exemplary block diagram of a resolution increasing module according to a third embodiment of the invention.

FIG. 6 is a block diagram of a resolution increasing module 31 according to the third embodiment. As illustrated in FIG. 6, the resolution increasing module 31 comprises the preprocessor 131, the quantization bit rate reducing module 132, the super-resolution converter 133, an image corrector 311, the quantization bit rate restoring module 134, and a data format converter 312.

The image corrector 311 and the data format converter 312 are functional modules obtained by functionally dividing the post-processor 135.

The image corrector 311 performs image correction such as gamma conversion on an image signal (a luminance signal and a color difference signal) received from the super-resolution converter 133. After that, the image corrector 311 outputs the luminance signal to the data format converter 312 as well as outputting the color difference signal to the quantization bit rate restoring module 134.

The data format converter 312 receives the luminance signal from the image corrector 311 and the color difference signal the quantization bit rate of which has been restored by the quantization bit rate restoring module 134 to the original value as before quantization bit rate reduction by the quantization bit rate reducing module 132. The data format converter 312 converts the data format of an image signal including a combination of the luminance signal and the color difference signal to another format such as RGB. The data format converter 312 then outputs the image signal to the moving-image improving module 14.

Figure 7:
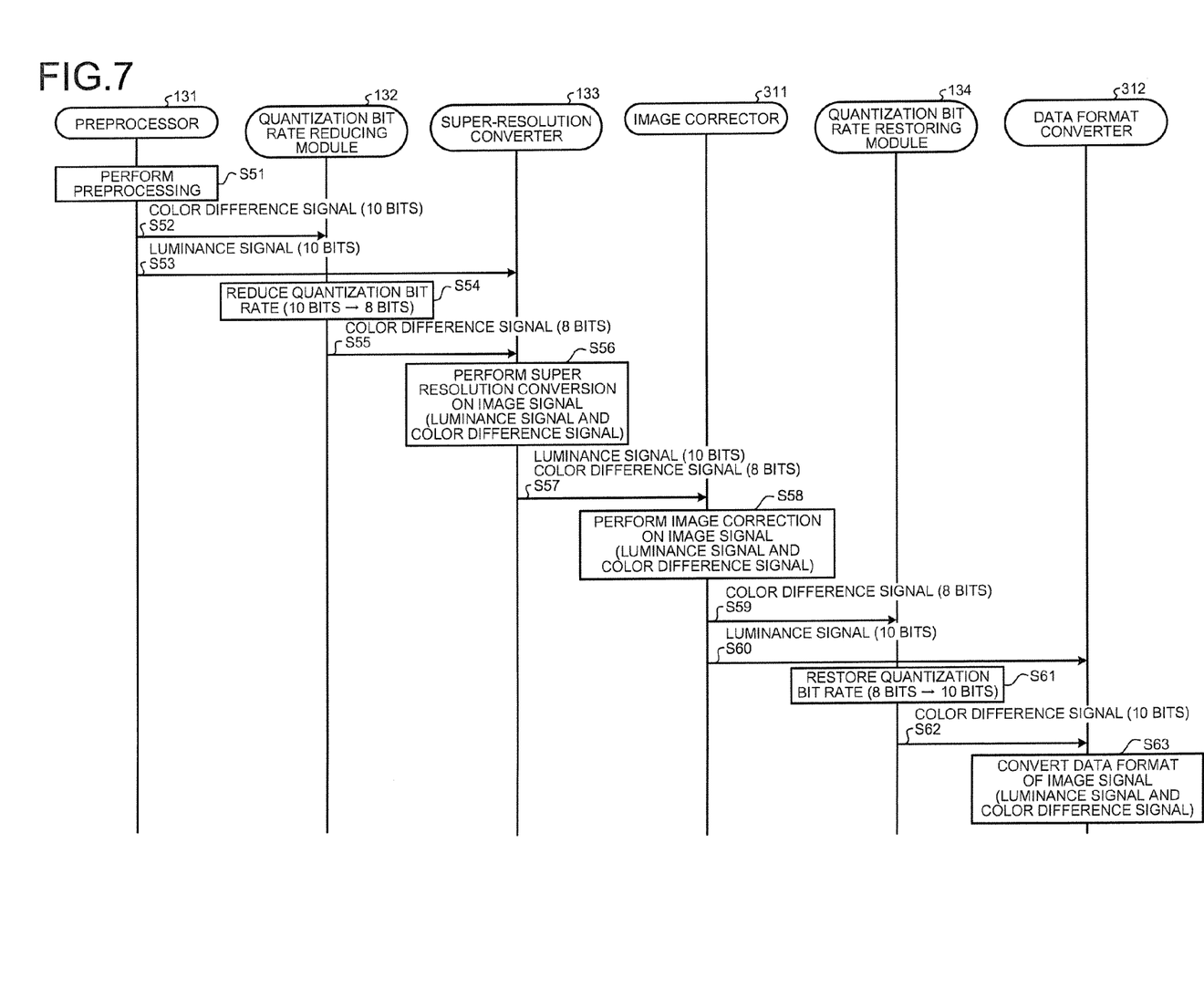
FIG. 7 is an exemplary sequence diagram of super resolution processing performed by the resolution increasing module of the second embodiment illustrated in FIG. 6.

With reference to FIG. 7, a description will be given of the operation of the resolution increasing module 31. FIG. 7 is a sequence diagram of the super resolution processing performed by the resolution increasing module 31. In the following, an example will be described in which an image signal (a luminance signal and a color difference signal) with a quantization bit rate of 10 bits is subjected to the processing and the 10 bits are reduced to 8 bits.

When an image signal is input from the central processor 12 to the resolution increasing module 31, the preprocessor 131 performs the preprocessing as described above on the image signal (S51). It is assumed herein that the luminance signal and the color difference signal subjected to the processing of the preprocessor 131 are of an image signal of the same frame.

From the image signal subjected to the preprocessing, the preprocessor 31 outputs the color difference signal (10 bits) to the quantization bit rate reducing module 132 (S52) as well as outputting the luminance signal (10 bits) to the super-resolution converter 133 (S53).

Upon receipt of the color difference signal from the preprocessor 131, the quantization bit rate reducing module 132 reduces the quantization bit rate of the color difference signal from 10 bits to 8 bits by bit shift, the use of a dither pattern, or the like (S54). Then, the quantization bit rate reducing module 132 outputs the 8-bit color difference signal to the super-resolution converter 133 (S55).

Upon receipt of an image signal including a combination of the luminance signal (10 bits) output from the preprocessor 131 and the color difference signal (8 bits) output from the quantization bit rate reducing module 132, the super-resolution converter 133 performs the super resolution conversion as described above on the image signal (S56). The super-resolution converter 133 then outputs the image signal to the image corrector 311 (S57).

Upon receipt of the image signal (the luminance signal and the color difference signal) from the super-resolution converter 133, the image corrector 311 performs the image correction as described above on the image signal (S58). Thereafter, from the image signal subjected to the image correction, the image corrector 311 outputs the color difference signal (8 bits) to the quantization bit rate restoring module 134 (S59), and outputs the luminance signal (10 bits) to the data format converter 312 (360).

Upon receipt of the color difference signal from the image corrector 311, the quantization bit rate restoring module 134 restores the quantization bit rate thereof to the original value as before the color difference signal is input to the quantization bit rate reducing module 132, i.e., from 8 bits to 10 bits (S61). The quantization bit rate restoring module 134 then outputs the color difference signal to the data format converter 312 (362).

Upon receipt of an image signal including a combination of the luminance signal (10 bits) output from the image corrector 311 and the color difference signal (10 bits) output from the quantization bit rate restoring module 134, the data format converter 312 converts the data format of the image signal to another format such as RGB (S63). After that, the data format converter 312 outputs the image signal to the moving-image improving module 14, and thereby the process ends.

As described above, according to the third embodiment, in an image signal including a combination of a luminance signal and a color difference signal, the quantization bit rate of only the color difference signal is reduced to a predetermined value before the super resolution conversion is performed on the image signal. Accordingly, the processing load involved in the super resolution conversion can be reduced. Thus, it is possible to efficiently perform the super resolution conversion as well as to maintain image quality.

Besides, the quantization bit rate is restored to the original value as before the quantization bit rate reduction. That is, the image signal is restored to the original state as before the quantization bit rate reduction. Thus, it is possible to prevent degradation in the quality of an image signal and to reduce the processing load involved in the super resolution conversion.

Moreover, the quantization bit rate of the color difference signal is restored immediately before the data format of the image signal is converted to another. This reduces the load involved in image processing performed after the super resolution conversion, and thus enables further efficient image processing (super resolution conversion).

While the image processing apparatus is described in the above embodiments as being applied to the image display apparatus that displays an image signal, this is by way of example only and is not to be considered as a limitation. For example, the image processing apparatus may be applied to a digital camera, a video camera, an image reproducer that reproduces a still image and a moving image, and the like.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
a super-resolution converter configured to estimate, upon receipt of a first image signal with first resolution, an original pixel value from the first image signal and increase pixels to obtain a second image signal with second resolution that is higher than the first resolution, the first image signal and the second image signal including a combination of a luminance signal and a color difference signal;
a reducing module located at a former stage of the super-resolution converter, the reducing module configured to reduce a first quantization bit rate of the color difference signal in the first image signal to be input to the super-resolution converter to a second quantization bit rate; and
a restoring module located at a latter stage of the super-resolution converter, the restoring module configured to restore the second quantization bit rate of the color difference signal in the second image signal to the first quantization bit rate.

2. The image processing apparatus of claim 1, further comprising a preprocessor configured to perform predetermined image processing on the first image signal before processing by the super-resolution converter, wherein
the reducing module is configured to reduce the quantization bit rate of the color difference signal in the first image signal subjected to the image processing by the preprocessor.

3. The image processing apparatus of claim 2, wherein the preprocessor comprises a first data converter configured to separate an image signal received from outside into the luminance signal and the color difference signal to obtain the first image signal.

4. The image processing apparatus of claim 3, wherein the reducing module is located at a latter stage of the first data converter, the reducing module configured to reduce the quantization bit rate of the color difference signal separated by the first data converter.

5. The image processing apparatus of claim 1, further comprising a post-processor configured to perform predetermined image processing on the second image signal including a combination of the luminance signal subjected to processing by the super-resolution converter and the color difference signal the quantization bit rate of which has been restored by the restoring module.

6. The image processing apparatus of claim 5, wherein the post-processor comprises a second data converter configured to convert the second image signal to another format.

7. The image processing apparatus of claim 6, wherein the restoring module is located at a former stage of the second data converter, the restoring module configured to restore the second quantization bit rate of the color difference signal in the second image signal to be input to the second data converter to the first quantization bit rate.

8. An image processing apparatus comprising:
a super-resolution converter configured to perform, upon receipt of a first image signal with first resolution, super resolution conversion to increase resolution of the first image signal to obtain a second image signal with second resolution, the first image signal and the second image signal including a combination of a luminance signal and a color difference signal;
a reducing module located at a former stage of the super-resolution converter, the reducing module configured to reduce a first quantization bit rate of the color difference signal in the first image signal to be input to the super-resolution converter to a second quantization bit rate; and
a restoring module located at a latter stage of the super-resolution converter, the restoring module configured to restore the second quantization bit rate of the color difference signal in the second image signal to the first quantization bit rate.

9. An image processing method conducted by an image processing apparatus that is configured to perform predetermined image processing on a first image signal with a first resolution, the first image signal including a combination of a luminance signal and a color difference signal, the image processing method comprising:
reducing, by the image processing apparatus, a first quantization bit rate of the color difference signal in the first image signal to a second quantization bit rate prior to the super resolution conversion;
increasing a pixel count of the first image signal to produce a second image signal with a second resolution that is higher than the first resolution; and
restoring, by image processing apparatus after producing the second image signal, the second quantization bit rate of a color difference signal in the second image signal to the first quantization bit rate.

* * * * *